Patented Feb. 6, 1945

2,368,657

UNITED STATES PATENT OFFICE 2,368,657

MANUFACTURE OF DYESTUFFS

Norman Hulton Haddock, Blackley, Manchester, England, assignor to Imperial Chemical Industries Limited, a corporation of Great Britain No Drawing. Application May 22, 1942, Serial No. 444,108. In Great Britain June 16, 1941

8 Claims. (Cl. 260—127)

The present invention relates to the manufacture of dyestuffs and intermediates therefor.

According to the invention we cause a p:p'-di(6-methylbenzthiazyl) azobenzene disulphonyl chloride (made as described below) to interact with a thiocyanoarylamine or an N-mono-alkyl or -aralkyl thiocyanoarylamine of the benzene series, thereby obtaining the corresponding di(thiocyanosulphonarylamide).

The invention also comprises the steps of hydrolysing a p:p'-di(6-methylbenzthiazyl) azobenzene-di(thiocyanosulphonarylamide) obtained in the above manner, to the corresponding p:p'-di(6-methylbenzthiazyl) azobenzene - di(mercapto - sulphonarylamide) and oxidising the latter to the corresponding polydisulphide.

The present polydisulphides represent sulphur-containing dyestuffs which may be applied to cellulosic material from sodium sulphide solution according to the usual practice with sulphur dyestuffs. By this means there are obtained bright orange-yellow shades possessing excellent fastness to severe washing, chemick and light.

The di(thiocyanosulphonarylamide) derivatives of p:p'-di(6-methylbenzthiazyl) azobenzene referred to above, not only constitute intermediates in the described manufacture of sulphur-containing dyestuffs, but may themselves be applied to cellulosic material from sodium sulphide solution according to the usual practice with sulphur dyestuffs. By this procedure the di(thiocyanosulphonarylamide) derivatives become hydrolysed in the sodium sulphide solution to the corresponding di(mercaptosulphonarylamide) derivatives. The latter subsequently become oxidised to polydisulphides on the fibre. Thus by the dyeing technique commonly employed with sulphur dyestuffs there are produced on the fibre the sulphur dyestuffs, to the production in substance of which the above-mentioned processes relate. In this way also, dyeings are obtained having the properties already described.

Accordingly, this invention is to be regarded as relating not only to the manufacture by the aforesaid processes of sulphur-containing dyestuffs in substance, but also to their production on the fibre, that is, on the cellulosic material directly, by employing in the technique usual in dyeing with sulphur dyestuffs, the above intermediate products, namely the di(thiocyanosulphonarylamide) derivatives of p:p'-di(6-methylbenzthiazyl) azobenzene.

The starting material which is a p:p'-di(6-methylbenzthiazyl) azobenzene disulphonyl chloride is made by treating with phosphorus pentachloride in a solvent such as benzene or o-dichlorbenzene (preferably above 140° C.) one of two disulphonic acids of p:p'-di(6-methylbenzthiazyl) azobenzene which are obtained (1) by sulphonating p:p'-di(6-methylbenzthiazyl) azobenzene and (2) oxidising dehydrothio-p-toluidine sulphonic acid with, for instance, sodium hypochlorite. (This latter disulphonic acid is the dyestuff Chlorazol Fast Yellow B, Colour Index No. 814 and is given the constitution: p:p'-di(6-methylbenzthiazyl) azobenzene-o : o'-disulphonic acid.) The disulphonyl chloride derivatives used as starting materials are accordingly two in number and differ in constitution in respect of the positions occupied by the disulphonyl chloride groups which positions depend on whether the corresponding disulphonic acid is made by (see above) process (1) or (2).

As thiocyanoarylamines or N-mono-alkyl or -aralkyl thiocyanoarylamines of the benzene series there may be used, for instance, p-thiocyano-N-methylaniline, p - thiocyanoaniline, p - thiocyano-o-aminoanisole, 2:5-dichloro-4-thiocyanoaniline or p-thiocyano-N-benzylaniline.

The invention is illustrated by but not confined to the following examples in which the parts are by weight.

Example 1

10 parts of p:p'-di(6-methylbenzthiazyl) azobenzene disulphonyl chloride (prepared as below) are added to 30 parts of molten p-thiocyano-N-methylaniline and the mixture stirred at 135–140° C. for 3 hours. After cooling to 80° C. 60–70 parts of alcohol are added and the orange precipitate is filtered and washed with alcohol. 11 parts of p:p'-di(6-methylbenzthiazyl) azobenzene-di(N - methyl -4 - thiocyanosulphonanilide) are obtained. The above product is dissolved in 100 parts of boiling alcohol containing 20 parts of sodium sulphide crystals. Hydrolysis of the di(N-methyl-4-thiocyanosulphonanilide) derivative to the corresponding di-(N - methyl-4-mercaptosulphonanilide) occurs. The solution is cooled, diluted with 300 parts of water. A stream of air is passed through. The di(N - methylmercaptosulphonanilide) becomes oxidised thereby to the corresponding polydisulphide which is thrown down as a precipitate. The precipitate is filtered off and dried. It forms a dark brown powder, soluble in concentrated sulphuric acid to give a bright orange-red solution, and in boiling aqueous sodium sulphide to an orange solution. Cotton is dyed from the latter in shades which after oxidising in the air are bright yellow, and possess excellent fastness to severe washing, chemick and good fastness to light.

The p:p'-di(6-methylbenzthiazyl)azobenzene disulphonyl chloride used above is prepared as follows: 12 parts of Chlorazol Fast Yellow B (Colour Index No. 814), 15 parts of phosphorus pentachloride and 150 parts of nitrobenzene are heated at 150–155° C. for 2 hours. The solution is cooled and the precipitate which forms is filtered, washed with benzene and dried. The product, p:p'-di(6-methylbenzthiazyl)azobenzene disulphonyl chloride, is a brown crystalline powder, soluble in hot organic solvents to give bright yellow solutions.

*Example 2*

5 parts of p:p'-di(6-methylbenzthiazyl)azobenzene disulphonyl chloride (made as described in Example 1), 5 parts of p-thiocyanoaniline and 10 parts of dry nitrobenzene are heated together with stirring at 110–120° C. for 2 hours. The resulting melt is poured into alcohol. The precipitate so formed is filtered and washed well with alcohol. The product, p:p'-di(6-methylbenzthiazyl)azobenzene di(4-thiocyanosulphonanilide) which is a yellowish-brown powder, is boiled for ¼ hour with 50 parts of alcohol and 5 parts of sodium sulphide crystals, a brownish-yellow solution of the disodium salt of the corresponding p:p'-di(6-methylbenzthiazyl)azobenzene-di-(mercaptosulphonanilide) being obtained. This is diluted with water, and oxidised by the addition of sodium m-nitrobenzene sulphonate at the boil until no more precipitation of the polydisulphide occurs. The bright yellow suspension is filtered, washed with water and dried. This yellow powder dissolves in dilute sodium sulphide solution, from which cotton is dyed in brownish-yellow shades, which on oxidising in air, become bright yellow.

*Example 3*

10 parts of p:p'-di(6-methylbenzthiazyl)azobenzene disulphonyl chloride (made as described in Example 1), 10 parts of 2-methoxy-4-thiocyanoaniline and 25 parts of dry nitrobenzene are heated together, with stirring, at 130° C. for 2 hours. The mixture is diluted with 100 parts of ethanol and the brownish-yellow precipitate filtered off and washed with ethanol and water.

The so-obtained p:p'-di(6-methylbenzthiazyl)-azobenzene di(2-methoxy-4-thiocyanosulphonanilide) is hydrolysed by boiling with 100 parts of ethanol and 10 parts of sodium sulphide crystals for ¼ hour to the corresponding di(2-methoxy-4-mercaptosulphonanilide). The clear brown solution of the sodium salt of the latter compound is diluted with 500 parts of water and oxidised to the corresponding polydisulphide either (a) by addition of sodium m-nitrobenzene sulphonate at the boil as in Example 2 or (b) by aeration in the cold as in Example 1. The polydisulphide is filtered off, washed and dried.

Both the polydisulphide and the di(2-methoxy-4-thiocyanosulphonanilide) dye cotton from aqueous sodium sulphide solutions in brownish yellow shades which on oxidising in the air become bright yellow. The shades possess very good fastness to severe washing, chemick and good fastness to light.

*Example 4*

5 parts of p:p'-di(6-methylbenzthiazyl)azobenzene disulphonyl chloride (made as in Example 1), and 10 parts of 2:5-dichloro-4-thiocyanoaniline are heated with stirring at 135° C. for 2½ hours. The dark coloured mixture is cooled to 90–100° and treated with 100 parts of ethanol. The brownish-yellow precipitate of p:p'-di(6-methylbenzthiazyl)azobenzene-di(2:5-dichloro-4-thiocyanosulphonanilide) is filtered off, washed with ethanol and water and dried. The yellow powder dissolves readily in boiling aqueous sodium sulphide solution containing a little cellosolve, from which solution cotton is dyed in shades which after oxidation in the air, are yellow and possess very good fastness to severe washing, chemick and good fastness to light.

*Example 5*

5 parts of p:p'-di(6-methylbenzthiazyl)azobenzene disulphonyl chloride (made as in Example 1), 10 parts of p-thiocyano-N-benzylaniline and 18 parts of dry nitrobenzene are heated with stirring at 130–135° C. for one and a half hours. The dark coloured mixture is cooled to about 90° C. and treated with 100 parts of ethanol. The brown solid p:p'-di(6-methylbenzthiazyl)azobenzene-di(N-benzyl-4-thiocyanosulphonanilide)) is filtered off and washed with ethanol and water.

The above product is hydrolysed by boiling with 100 parts of ethanol containing 10 parts of sodium sulphide crystals to the corresponding di(N-benzyl-4-mercaptosulphonanilide). The clear brown solution of the latter compound is then oxidised to the corresponding polydisulphide by the addition of sodium m-nitrobenzene sulphonate at the boil as in Example 2. The yellow precipitate of polydisulphide is filtered off, washed and dried. It dyes cotton (with air oxidation) in yellow shades of very good fastness properties from boiling dilute sodium sulphide solutions.

*Example 6*

5 parts of p:p'-di(6-methylbenzthiazyl)azobenzene disulphonyl chloride (made as described below), 10 parts of p-thiocyanoaniline and 18 parts of nitrobenzene are heated with stirring at 130–135° C. for 1½ hours. After cooling to 90–100° C., 200 parts of ethanol are added and the yellow p:p'-di(6-methylbenzthiazyl)azobenzene-di(4-thiocyanosulphonanilide) filtered off and washed with ethanol.

The above di(4-thiocyanosulphonanilide) is hydrolysed by boiling with 50 parts of ethanol and 5 parts of sodium sulphide crystals for ¼ hour to the corresponding di(4-mercaptosulphonanilide). By oxidising the latter by the addition of sodium nitrobenzene sulphonate at the boil the corresponding polydisulphide is obtained as a yellow solid. It is filtered off, washed with water and dried. It dissolves in dilute aqueous sodium sulphide, from which solution cotton is dyed in yellow shades, which become brighter on oxidation in the air and have good fastness properties.

The p:p'-di(6-methylbenzthiazyl)azobenzene disulphonchloride used above is prepared as follows: 10 parts of p:p'-di(6-methylbenzthiazyl)-azobenzene are added to 65 parts of 20% oleum during 10 minutes with stirring at 25° C. Stirring is continued for 5 minutes and 10 parts of 65% oleum are added. The sulphonation mixture is stirred at 25° C. until a sample is readily and completely soluble in dilute ammonia (on shaking for 10–15 minutes) and poured on to ice. The yellow precipitate of the sulphonic acid is filtered off, washed with salt solution until free from acid and dried. 15 parts of this sulphonic acid (passed through 100 mesh sieve), 100 parts of phosphorus pentachloride and 25 parts of phosphorus oxychloride are heated with stirring in an oil bath at 161–165° C. for 3 hours. After cooling overnight, the pasty mass is added gradually to crushed ice. The precipitated sulphonchloride is filtered off, washed thoroughly with water and then with acetone and dried at 80° C.

Example 7

5 parts of p:p'-di(6-methylbenzthiazyl)azobenzene disulphonchloride (made as described in Example 6), 10 parts of p-thiocyano-N-methylaniline and 18 parts of dry nitrobenzene are heated at 130–135° C. for 1½ hours. The mixture is diluted with 200 parts of ethanol and the yellow solid (p:p'-di(6-methylbenzthiazyl)-azobenzene -di(N-methyl - 4 - thiocyanosulphonanilide)) filtered off and washed with ethanol and water.

The di(N-methyl-4-thiocyanosulphonanilide) is hydrolysed by boiling with 50 parts of ethanol and 5 parts of sodium sulphide crystals for ¼ hour to the corresponding mercapto compound. After dilution with 500 parts of water, the solution is oxidised with sodium m-nitrobenzene sulphonate at the boil (as in Example 2). The precipitated polydisulphide is filtered off, washed and dried. It is a yellow-brown powder, readily soluble in aqueous sodium sulphide, from which solution cotton is dyed in yellow shades, which become brighter on oxidation in the air and have good fastness properties.

Example 8

5 parts of p:p'-di(6-methylbenzthiazyl)azobenzene disulphonyl chloride (made as described in Example 6), 10 parts of p-thiocyano-N-benzylaniline and 18 parts of dry nitrobenzene are heated in an oil bath at 130–135° C. for 1½ hours. The dark coloured mixture after cooling to 90–100° C. is treated with 200 parts of ethanol and the brown precipitate (the N-benzyl-4-thiocyanosulphonanilide) filtered off and washed with ethanol and water. It is hydrolysed to the corresponding mercapto compound and the latter oxidised to the polydisulphide as described in Example 5. The polydisulphide dyes cotton from solution in aqueous sodium sulphide in yellow shades of very good fastness to severe washing, chemick and good fastness to light.

Example 9

5 parts of p:p'-di(6-methylbenzthiazyl)azobenzene sulphonchloride (made as described in Example 6), 7 parts of 2-methoxy-4-thiocyanoaniline and 18 parts of dry nitrobenzene are heated at 125–30° C. for 2 hours and then at 135–40° C. for ¾ hour. After cooling, the melt is treated with 200 parts of ethanol and the brownish-yellow precipitate filtered off and washed with ethanol and water.

The above product (p:p'-di(6-methylbenzthiazyl)azobenzene-di(2 - methoxy-4-thiocyanosulphonanilide)) is hydrolysed to the corresponding mercapto compound and oxidised to the polydisulphide as described in Example 3. It dissolves readily in boiling dilute aqueous sodium sulphide from which solution cotton is dyed in yellow shades of very good fastness properties.

I claim:

1. A sulfur dye made by heating a p:p'-di(6-methylbenzthiazyl)azobenzene - di(4- thiocyanosulfonanilide) in a non-aqueous organic solvent with sodium sulfide until by hydrolization the corresponding di(4-mercaptosulfonanilide) is formed and then oxidizing until the corresponding polysulfide is formed.

2. A sulfur dye made by heating p:p'-di(6-methylbenzthiazyl)azobenzene -di(2-methoxy-4-thiocyanosulfonanilide) in a non-aqueous organic solvent with sodium sulfide until by hydrolization the corresponding di(4-mercaptosulfonanilide) is formed and then oxidizing un- 3. A sulfur dye made by heating p:p'-di(6-methylbenzthiazyl)azobenezene-di(2-5-dichloro-4-thiocyanosulfonanilide) in a non-aqueous organic solvent with sodium sulfide until by hydrolization the corresponding di(4-mercaptosulfonanilide) is formed and then oxidizing until the corresponding polysulfide is formed.

4. A sulfur dye made by heating p:p'-di(6-methylbenzthiazyl)azobenzene - di(4 - thiocyanosulfonanilide) in a non-aqueous organic solvent with sodium sulfide until by hydrolization the corresponding di(4-mercaptosulfonanilide) is formed and then oxidizing until the corresponding polysulfide is formed.

5. The process of making a sulfur dye which comprises heating a p:p'-di(6-methyl-benzthiazyl)azobenzene-di(4-thiocyanosulfonanilide) with sodium sulfide in a non-reactive liquid organic solvent until the corresponding p:p'-di(6-methyl-benzthiazyl)azobenzene-di(4 - mercaptosulfonanilide) is formed, and then adding water and an oxidizing agent until the corresponding polydisulfide is formed.

6. The process in accordance with claim 5 in which p:p'-(6 - methyl - benzthiazyl)azobenzene-di(2-methoxy-4-thiocyanosulfonanilide) is heated with sodium sulfide.

7. The process in accordance with claim 5 in which p:p'-(6 - methyl - benzthiazyl)azobenzene-di(2-5-dichloro-4-thiocyanosulfonanilide is heated with sodium sulfide.

8. The process in accordance with claim 5 in which p:p'-(6 - methyl - benzthiazyl)azobenzene-di(4-thiocyanosulfonanilide) is heated with sodium sulfide and the organic solvent is alcohol.

NORMAN HULTON HADDOCK.